United States Patent
Yusa

(10) Patent No.: US 7,389,445 B2
(45) Date of Patent: Jun. 17, 2008

(54) CIRCUIT FOR DETECTING ABNORMAL OPERATION OF MEMORY AND INTEGRATED CIRCUIT AND METHOD FOR DETECTING ABNORMAL OPERATION

(75) Inventor: Atsushi Yusa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 390 days.

(21) Appl. No.: 10/622,780

(22) Filed: Jul. 21, 2003

(65) Prior Publication Data

US 2004/0153783 A1 Aug. 5, 2004

(30) Foreign Application Priority Data

Jul. 26, 2002 (JP) ............................. 2002-218045

(51) Int. Cl.
*G06F 11/00* (2006.01)
(52) U.S. Cl. ........................................ 714/30; 714/719
(58) Field of Classification Search ................. 714/30, 714/719, 724, 733–736
See application file for complete search history.

(56) References Cited

U.S. PATENT DOCUMENTS

| | | | | |
|---|---|---|---|---|
| 4,905,174 A | * | 2/1990 | Ouchi | 708/141 |
| 5,132,937 A | * | 7/1992 | Tuda et al. | 365/201 |
| 5,424,880 A | * | 6/1995 | Nakano et al. | 360/26 |
| 5,455,536 A | * | 10/1995 | Kono et al. | 329/325 |
| 5,640,508 A | * | 6/1997 | Fujiwara et al. | 714/30 |
| 6,115,416 A | * | 9/2000 | Katsman et al. | 375/224 |
| 6,127,866 A | * | 10/2000 | Chu et al. | 327/158 |
| 6,128,572 A | * | 10/2000 | Suzuki | 701/207 |
| 2002/0143517 A1 | * | 10/2002 | Kobayashi et al. | 703/19 |

FOREIGN PATENT DOCUMENTS

| | | |
|---|---|---|
| JP | 61-284900 | 12/1986 |
| JP | 02-105393 | 4/1990 |
| JP | 06-123759 | 5/1994 |

* cited by examiner

*Primary Examiner*—Dieu-Minh Le
(74) *Attorney, Agent, or Firm*—Volentine & Whitt, P.L.L.C.

(57) ABSTRACT

In a circuit for detecting an abnormal operation of memory, an integrated circuit including the same and a method for detecting an abnormal operation, an abnormal operation of memory is detected before an error occurs in the integrated circuit of a micro-computer and the like due to data wrongly output from the memory, enhancing the reliability of the integrated circuit. More specifically, a circuit is provided for detecting an abnormal operation of memory and includes a delay circuit for delaying an output data of memory for a predetermined period of time and for outputting this data as a delay data; and a comparison circuit for outputting a noncoincidence signal in a case that the output data of the memory and the delay data as compared are not coincident with each other.

21 Claims, 5 Drawing Sheets

CIRCUIT FOR DETECTING ABNORMAL OPERATION OF MEMORY AND INTEGRATED CIRCUIT AND METHOD FOR DETECTING ABNORMAL OPERATION

BACKGROUND OF THE INVENTION

1. Field of the Invention

The present invention relates to a technique of detecting an abnormal operation of memory built in an integrated circuit and the like of a micro-computer and the like with regard to an access speed and the like.

2. Description of the Related Art

A flash memory is built in some integrated circuits of micro-computers and the like. A control circuit for rewriting and erasing data is added to the integrated circuits in which a memory is built, replacing a mask read only memory with a flash memory and the like. In this conventional integrated circuit, a method for checking the reliability of the written data continuously does not exist.

In the integrated circuits in which a flash memory and the like is built, however, the written data sometimes changes due to a write-in disturbance in rewriting data, a read disturbance in reading out data, a data retention or the like. Or even though the data does not change, the period of time from inputting an address to outputting data, that is, the access time, of the memory sometimes becomes significantly long. If the access time becomes long, the data-outputting cannot keep up with the operation speed of the integrated circuit of the micro-computer and the like. As a result, an error is to occur in the integrated circuit. Especially in the case of using a flash memory for storing an operation program in a micro-computer and the like, the micro-computer cannot operate normally even when the data output wrongly from the flash memory by only one bit. Therefore, a high cost is needed to ensure the reliability of a memory for storing a program.

In order to correct the error of the output from the memory, using an error correction code (hereafter, referred to as the "ECC") may be considered. In this case, however, a parity bit for correcting is needed as well as a bit for data. And in some cases, a storage capacity is to be needed 1.5 times as much as the program capacity to be actually used. This makes the chip size increase and the cost high. Moreover, the ECC cannot correct the error of data with two bits or more in a single address.

SUMMARY OF THE INVENTION

The present invention has been achieved in view of aforementioned problems. The object of the present invention is to provide novel and improved circuit for detecting an abnormal operation of memory, integrated circuit including the same and a method for detecting an abnormal operation, in order to detect an abnormal operation of memory before an error occurs in the integrated circuit of a micro-computer and the like due to the data wrongly output from the memory and to enhance the reliability of integrated circuit.

In the aspect of the present invention to achieve the above object, there is provided a circuit for detecting an abnormal operation of memory comprising: a delay circuit for delaying an output data of the memory for a predetermined period of time and for outputting this data as a delay data; and a comparison circuit for outputting a noncoincidence signal in case that the output data of the memory and the delay data are not coincident with each other after compared.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

DETAILED DESCRIPTION OF THE PREFERRED EMBODIMENTS

Figure 1:
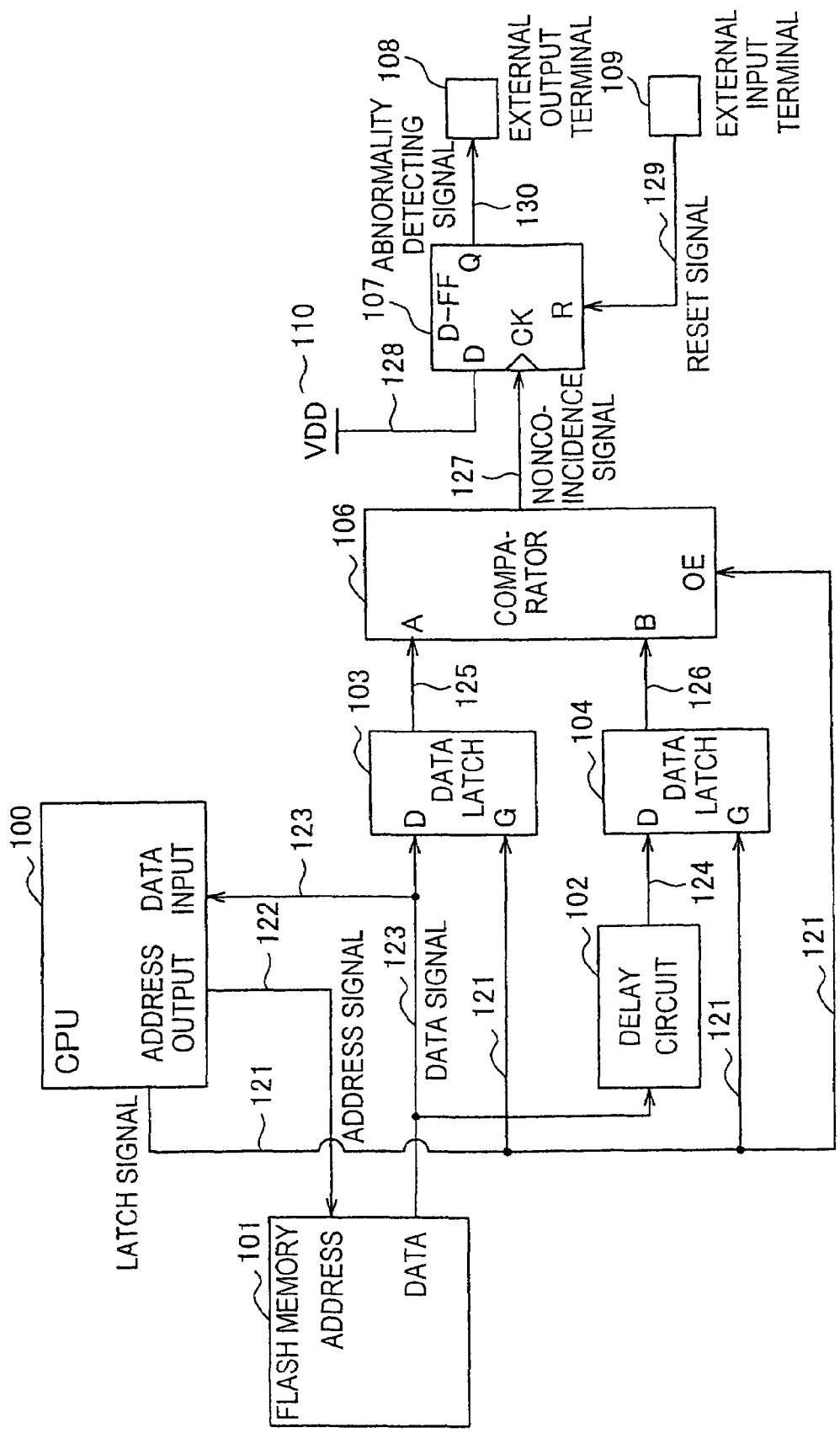
FIG. 1 is a block circuit diagram showing the structure of the first embodiment of the present invention.

Hereinafter, the preferred embodiment of the present invention will be described in reference to the accompanying drawings. Same reference numerals are attached to components having same functions in following description and the accompanying drawings, and a description thereof is omitted.

First Embodiment

FIG. 1 is a block circuit diagram showing the structure of the first embodiment of the present invention. An address signal output 122 from a CPU 100 is input to an address input terminal of a flash memory 101. Then the data stored in the input address in the flash memory 101 is respectively input as a data signal 123 to a data input terminal of the CPU 100, to an input terminal D of a first data latch 103 and to an input terminal of a delay circuit 102. The data signal 123 input to the delay circuit 102 is output as a delay circuit output 124 delayed for a predetermined period of time, and is input to the input terminal of a second data latch 104.

And then a data latch signal 125 of the first data latch 103 is input to one input terminal A of a comparator 106. The data output of the second data latch 104, that is, a delay data latch signal 126 is input to the other input terminal B of the comparator 106.

On the other hand, a latch signal 121 from the CPU 100 is respectively input to a latch signal input terminal G of the first data latch 103, to a latch signal input terminal G of the second data latch 104 and to an output control terminal OE (Outlet Enable) of the comparator 106. Each of the data latch 103 and the data latch 104 hold the latched values at the rising of the latch signal 121 at an H section of the latch signal 121. On the other hand, the latched data signal 123 and the latched delay circuit output 124 are output as the data latch signal 125 and the delay data latch signal 126 respectively at the time of an L section of the latch signal 121.

At each timing of the rising of latch signal 121 to be input to the output control terminal OE, the comparator 106 outputs a logical signal "L" if the signal at the input terminal A equals to the one at the input terminal B, and outputs a logical signal "H" as a noncoincidence signal 127 if the signal at the input terminal A does not equal to the one at the input terminal B. Then the noncoincidence signal 127 from the comparator 106 is input to an input terminal CK of a D-FF 107. A power source 128 from a power source VDD 110 is connected to an input terminal D of the D-FF 107.

And then an abnormality detecting signal 130 turning into "H" state in detecting an abnormality is output from an output terminal Q of the D-FF 107, which is connected to an external output terminal 108. Also, a reset signal 129 from the external input terminal 109 is connected to a reset input terminal R of the D-FF 107. And then when the reset signal 129 is input from the external input terminal, the abnormality detecting signal 130 returns to "L" state (FIG. 1).

Figure 2:
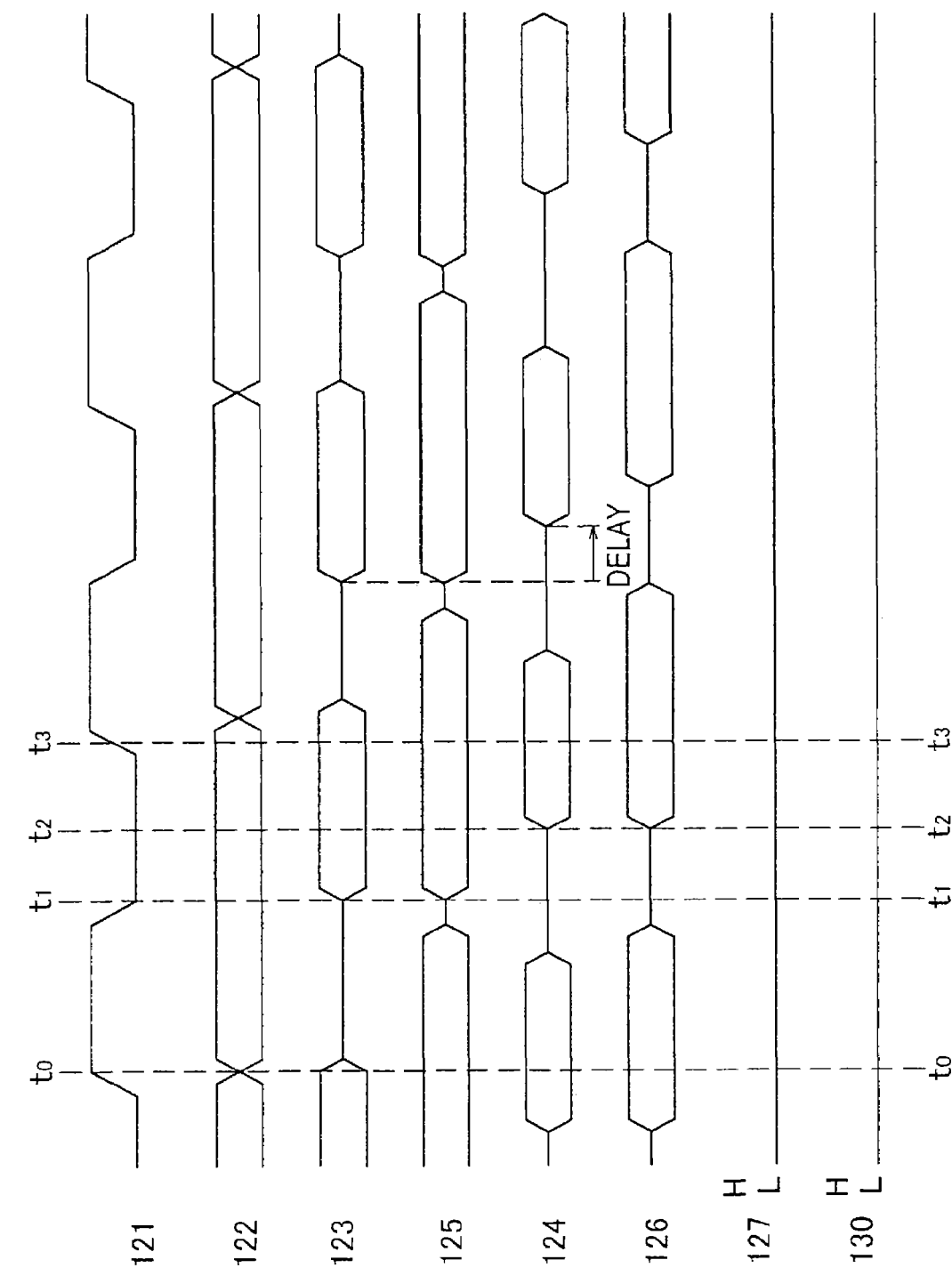
FIG. 2 is a timing chart in a normal state of the data signal output from a flash memory in the first embodiment.
Figure 3:
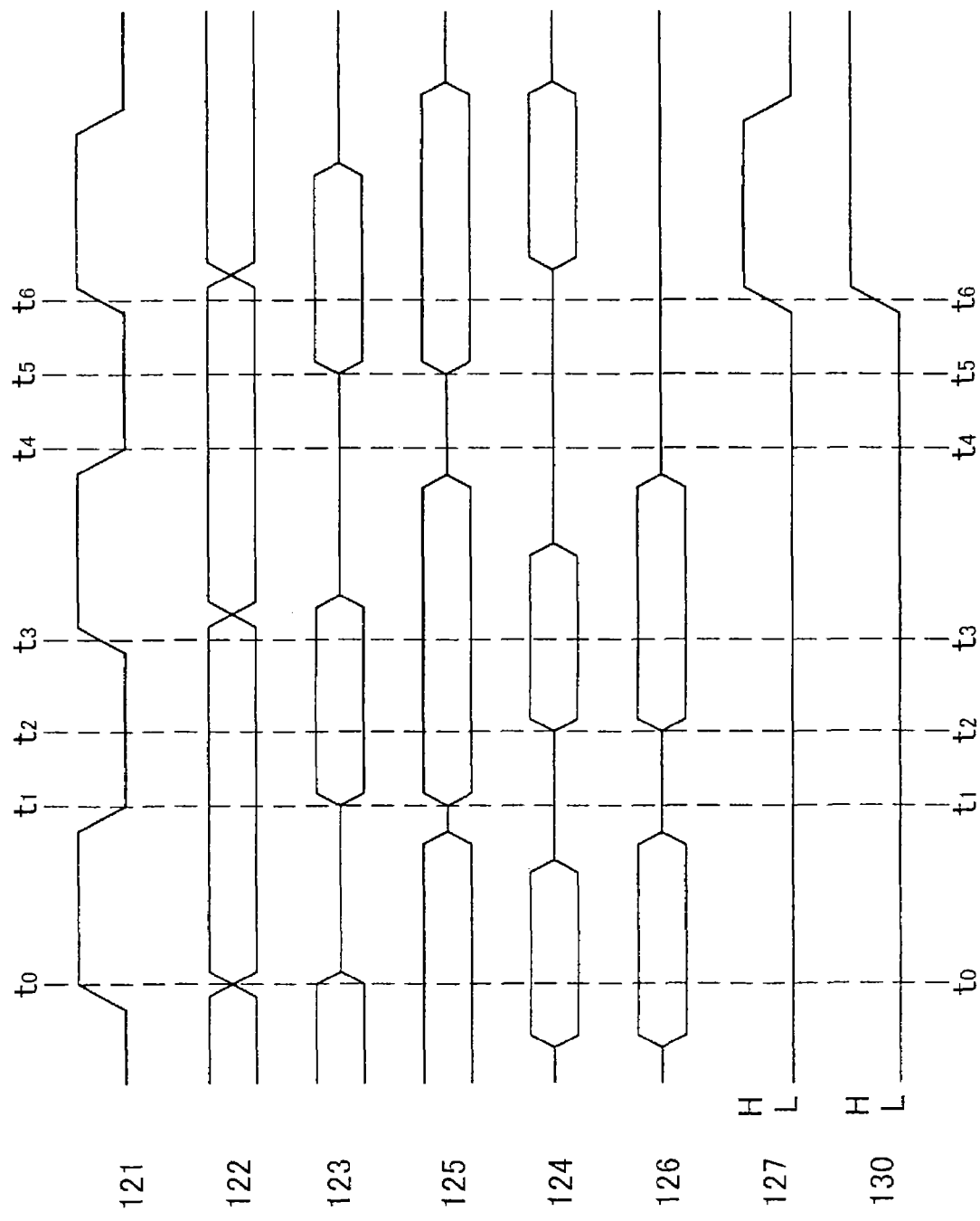
FIG. 3 is a timing chart when an abnormality is detected halfway in the data signal output from the flash memory in the first embodiment.

Next, the operation of the first embodiment will be explained in reference to FIGS. 1-3. FIG. 2 is a timing chart in a normal state of the data signal output from a flash memory in the first embodiment. FIG. 3 is a timing chart when an abnormality is detected halfway in the data signal output from the flash memory in the first embodiment.

The flash memory 101 outputs the data signal 123 at a timing $t_1$ after a certain period of time (access time; $(t_1-t_0)$), from receiving the address signal 122 from the CPU 100 with the starting point set at "$t_0$". The CPU 100 downloads the data of the data signal 123 at a timing $t_3$ at which the latch signal 121 turns into "H" state, and processes the data in the CPU 100, based on a predetermined program (FIG. 2).

The data signal 123 is delayed for a period of time $(t_2-t_1)$ in the delay circuit 102 and is output as the delay circuit output 124. The data signal 123 and the delay circuit output 124 are respectively compared in the comparator 106 via the first data latch 103 and the second data latch 104. If they coincide with each other at the timing $t_3$ at which the latch signal 121 rises to turn into "H" state, the noncoincidence signal 127 remains "L" state (FIG. 2).

However, if the access time of the flash memory 101 is delayed and the output of the data signal 125 is at a timing $t_5$ without being output at a timing $t_4$ after receiving the address signal 122, the delay circuit 102 cannot output the data signal 124 at a timing $t_6$ at which the latch signal 121 rises to "H" state and the comparator 106 judges there to be noncoincidence, to turn the noncoincidence signal 127 into "H" state (FIGS. 1 and 3).

If there is a rising edge at which the noncoincidence signal 127 turns into "H" state, the D-FF 107 downloads the "H" data at the input terminal D connected to the power source VDD 110 and an abnormality detecting signal 130 is turned from "L" state into "H" state. Then it is notified to the outside that the output of the external output terminal 108 connected to the output terminal Q of the D-FF 107 turns from "L" state into "H" state and that the access time of the flash memory has changed (been delayed), in other words, the abnormal operation of the flash memory 101 (FIGS. 1 and 3).

If the abnormal operation is detected in the flash memory 101, some operation may be implemented outside thereof, for example: sounding alarm with sound, image and animation; urging backup; carrying maintenance; and so on. In returning the output from the external output terminal 108 from "H" state into "L" state, the state of the D-FF 107 should be reset by turning the signal to be input into the external input terminal 109 from "L" state into "H" state (FIG. 1).

According to the first embodiment as described above, the access speed of the data signal is high enough to match the timing to use in the CPU, however, it is monitored whether the noncoincidence will occur or not by giving a predetermined period of delay and by comparing the data before and after the delay with each other. In other words, by checking whether the margin for delay is always saved with regard to the timing for the CPU to download the data signal, it can be detected that the access speed in the flash memory begins to become lowered for some reasons when the noncoincidence occurs, though there is an enough amount of margin in an initial state. Consequently, we can learn of an abnormality before an error occurs in the integrated circuit of the micro-computer and the like in which a flash memory is built, to prevent abnormal operation due to a wrong data signal with the access speed further lowered.

Second Embodiment

Figure 4:
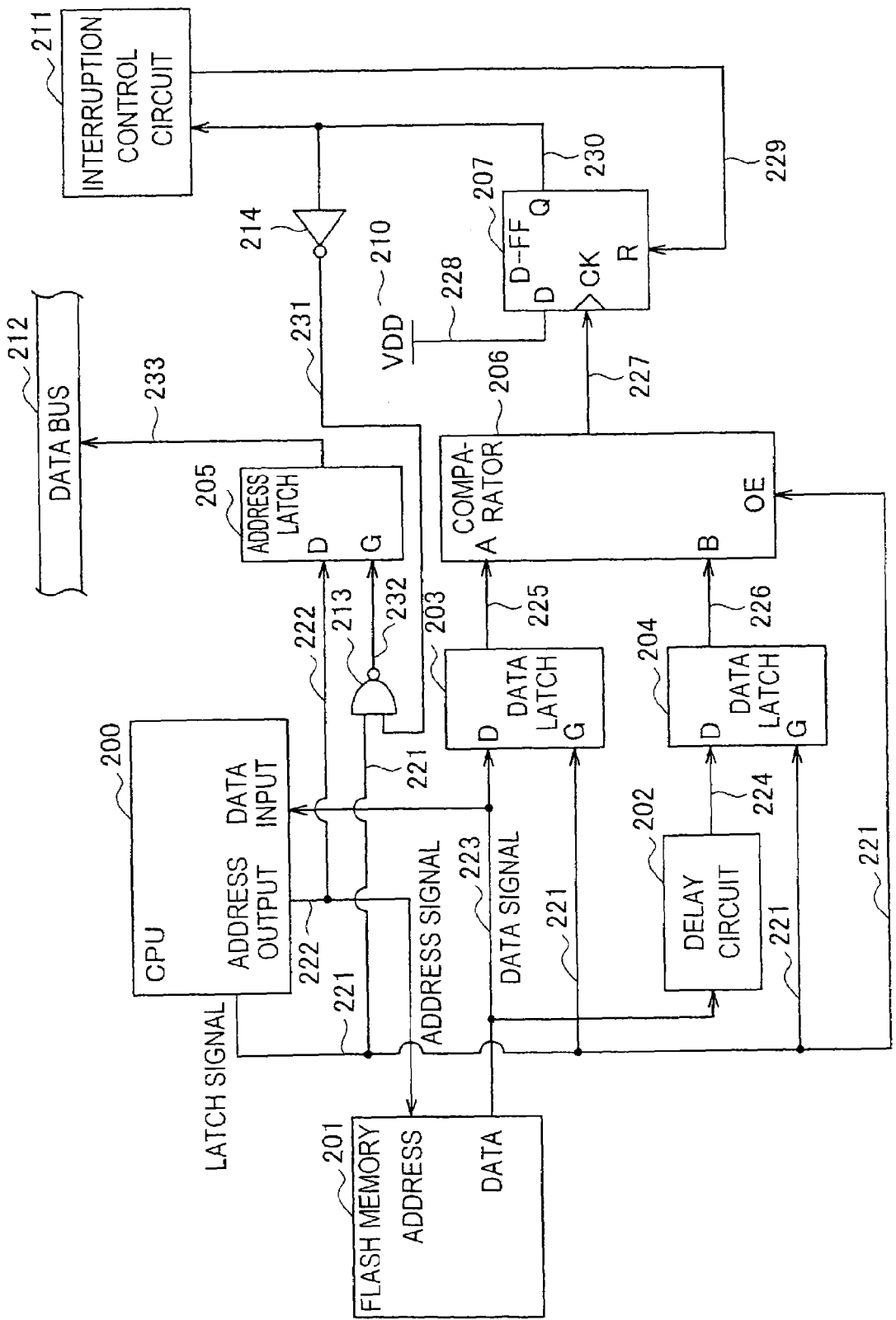
FIG. 4 is a block circuit diagram showing the structure of the second embodiment of the present invention.

FIG. 4 is a block circuit diagram showing the structure of the second embodiment of the present invention. There are some points different from those in the first embodiment: providing an address latch 205; and connecting an output terminal Q of a D-FF 207 connected to the external output terminal 108 in the first embodiment to the interruption control circuit 211 in this second embodiment. Hereafter, an explanation is to be given with regard to the different points while an explanation is to be omitted with regard to the same points as the ones in the first embodiment.

An address signal output 222 from a CPU 200 is connected to a D-latch of the address latch 205 while a latch signal 221 is input to one end of a two-input NAND element 213. The output terminal Q of the D-FF 207 is connected to the interruption control circuit 211 and to an input terminal of an inverter 214 while an output 231 from the inverter 214 is input to the other end of the two-input NAND element 213. An output 232 (NAND output) from the two-input NAND element 213 is connected to a latch signal input terminal G of the address latch 205. And then a latch output 233 from the address latch 205 is connected to a data bus 212 while a reset signal 229 from the interruption control circuit 211 to a reset input terminal R of the D-FF 207 (FIG. 4).

Figure 5:
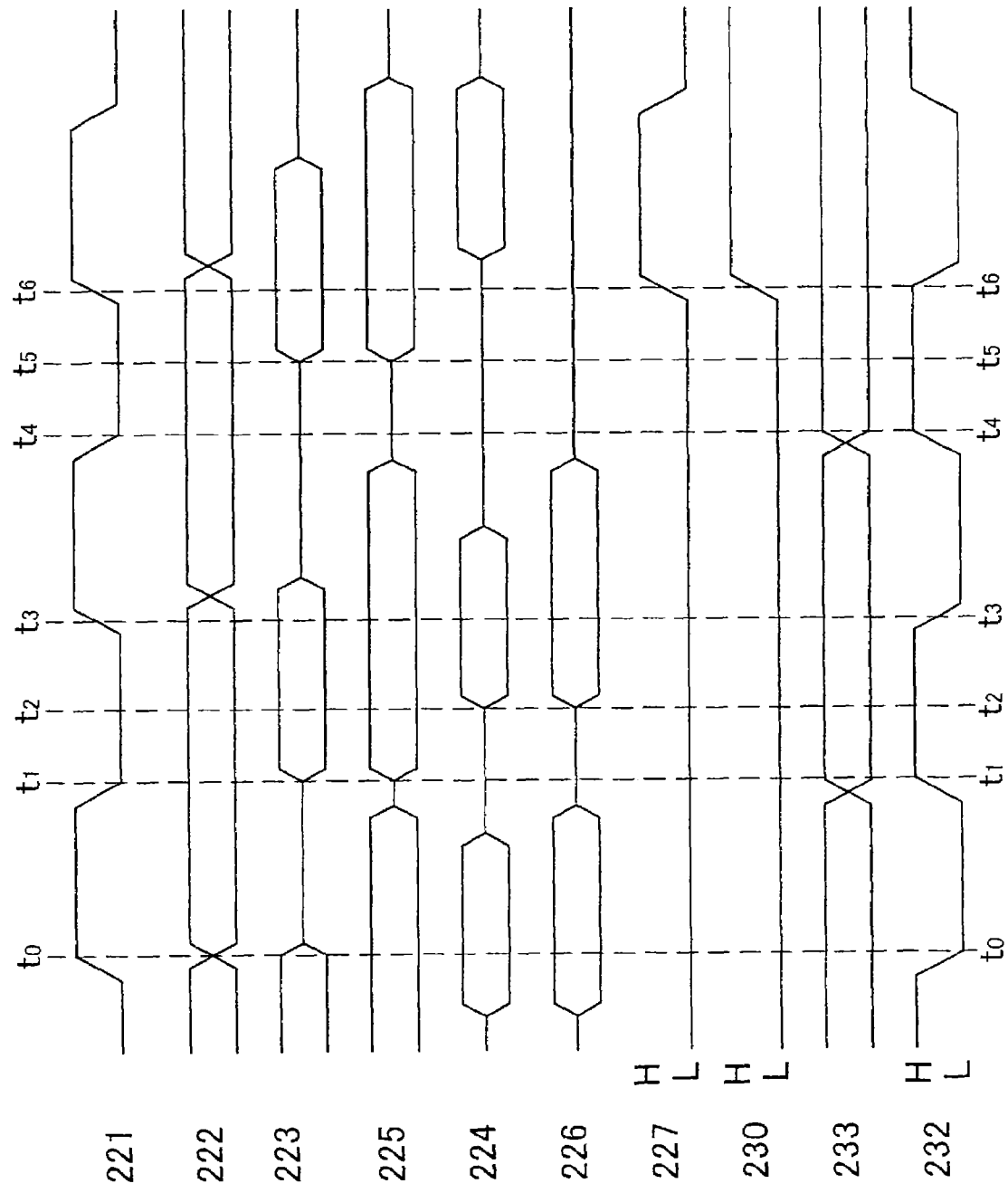
FIG. 5 is a timing chart when an abnormality is detected halfway in the data signal output from the flash memory in the second embodiment.

Next, the operation of the second embodiment will be explained in reference to FIGS. 4 and 5. FIG. 5 is a timing chart when an abnormality is detected halfway in the data signal output from the flash memory in the second embodiment.

The explanation of the flow of operation from the beginning until outputting an abnormality detecting signal 230 from the output terminal Q of the D-FF 207 is to be omitted since it is the same as the one in the first embodiment. When the abnormality detecting signal 230 turns into "H" state, it is input to the interruption control circuit 211 as an interruption signal to execute the pre-programmed interruption process in the CPU 200. There are some options as the interruption process, for example, notifying an abnormality, rewriting memory, and so on.

In referring to an address judged to be noncoincident during the interruption process, the address latched by the address latch 205 at the rising of the NAND output 232 of the latch signal 221 and of an inversion signal 231 of the abnormality detecting signal 230, remains latched during the period when the abnormality detecting signal 230 is in "H" state. Therefore, the address can be read out via the data bus 212. After finishing the execution of the interruption process, the reset signal 229 is output from the interruption control circuit 211. And then the D-FF 207 becomes reset, and the abnormality detecting signal 230 returns to "L" state from "H" state (FIGS. 4 and 5).

According to the second embodiment as described above, when the margin runs short with regard to the access speed of data, an internal signal in an integrated circuit of micro-computer and the like can be used to cope with this problem as well as outputting a signal to the external output terminal. Also, since the address of the data with the margin thereof run short can be held and can be read out by the CPU, the rewriting of the address data can be automatically executed before an error occurs in the CPU.

In the second embodiment, when the access speed can be recovered with such a process as rewriting the flash memory, since the process from the outside is not needed the reliability of a built-in flash memory can be enhanced, as a result.

Also in the first and second embodiments, the delay time in the delay circuit is fixed. However, the margin of access speed to be judged abnormal can be adjusted by providing the circuit in which the delay time can be adjusted inside the delay circuit. Hereby the yield of product can be enhanced by being capable of considering the unevenness in quality due to the quality of the built-in flash memory.

According to the embodiments as described above, there has been explained by giving an example in which a flash memory is used, however, the memory to be utilized in the present invention is not restricted to this example.

Although the preferred embodiment of the present invention has been described referring to the accompanying drawings, the present invention is not restricted to such examples. It is evident to those skilled in the art that the present invention may be modified or changed within a technical philosophy thereof and it is understood that naturally these belong to the technical philosophy of the present invention.

What is claimed is:

1. A circuit for detecting an abnormal operation of memory comprising:
    a delay circuit for delaying an output data output from the memory for a predetermined period of time and for outputting a delayed data responsive thereto; and
    a comparison circuit for outputting a noncoincidence signal when the output data output from the memory and the delayed data are not coincident with each other,
    wherein a delay time of the output data of the memory can be adjusted in the delay circuit.

2. A circuit for detecting an abnormal operation of memory according to claim 1 wherein an abnormal operation with regard to an access speed of the memory is detected.

3. A circuit for detecting an abnormal operation of memory according to claim 1 further comprising a circuit for holding address information in case of noncoincidence in response to the noncoincidence signal.

4. A circuit for detecting an abnormal operation of memory according to claim 1 further comprising a circuit for sounding an alarm when the noncoincidence signal is output.

5. A circuit for detecting an abnormal operation of memory according to claim 1 further comprising a circuit for executing an interruption when the noncoincidence signal is output.

6. A circuit for detecting an abnormal operation of memory according to claim 1 wherein the memory is a flash memory.

7. An integrated circuit comprising:
    a memory which stores data;
    a delay circuit which delays an output data from the memory and outputs a delayed data responsive thereto;
    a comparison circuit which compares the output data from the memory and the delayed data, and which outputs a noncoincidence signal when the output data and the delayed data are not coincident;
    a first latch circuit which stores the output data output from the memory; and
    a second latch circuit which stores the delayed data, wherein the comparison circuit receives the output data stored in the first latch circuit and the delayed data stored in the second latch circuit.

8. The integrated circuit according to claim 7, further comprising an address information storing circuit which stores an address information when the comparison circuit outputs the noncoincidence signal.

9. A method for detecting an abnormal operation of memory comprising:
    delaying an output data output from the memory for a predetermined period of time and outputting a delayed data responsive thereto; and
    outputting a noncoincidence signal when the output data output from the memory and the delayed data are not coincident with each other,
    wherein a delay time of said delaying is adjustable.

10. A method for detecting an abnormal operation of memory according to claim 9 wherein an abnormal operation with regard to an access speed of the memory is detected.

11. A method for detecting an abnormal operation of memory according to claim 9 further comprising holding address information in case of noncoincidence in response to the noncoincidence signal.

12. A method for detecting an abnormal operation of memory according to claim 9 further comprising sounding an alarm when the noncoincidence signal is output.

13. A method for detecting an abnormal operation of memory according to claim 9 further comprising executing an interruption of a CPU when the noncoincidence signal is output.

14. A method for detecting an abnormal operation of memory according to claim 9 further comprising rewriting data in the memory when the noncoincidence signal is output.

15. A method for detecting an abnormal operation of memory according to claim 9 wherein the memory is a flash memory.

16. An integrated circuit comprising:
    a memory that stores data;
    a delay circuit, directly coupled to the memory, that delays stored data output from the memory for a predetermined period of time and that outputs delayed data responsive thereto; and
    a comparison circuit, coupled to the memory and the delay circuit, that compares the stored data output from the memory with the delayed data, and that outputs a noncoincidence signal when the stored data output from the memory and the delayed data are not coincident with each other, the noncoincidence signal indicative of abnormal operation of the memory,
    wherein a delay time of the delay circuit is selectively adjustable.

17. An integrated circuit according to claim 16, wherein abnormal access speed is detected as the abnormal operation of the memory.

18. An integrated circuit according to claim 16, further comprising a circuit that holds an address of the stored data output from the memory responsive to noncoincidence as indicated by the noncoincidence signal.

19. An integrated circuit according to claim 16, further comprising a circuit that sounds an alarm responsive to output of the noncoincidence signal.

20. An integrated circuit according to claim 16, further comprising a circuit that executes an interruption responsive to output of the noncoincidence signal.

21. An integrated circuit according to claim 16, wherein the memory is a flash memory.

* * * * *